H. E. COLEMAN.
BANDING WHEEL.
APPLICATION FILED AUG. 5, 1910.
1,051,689.
Patented Jan. 28, 1913.
2 SHEETS—SHEET 2.
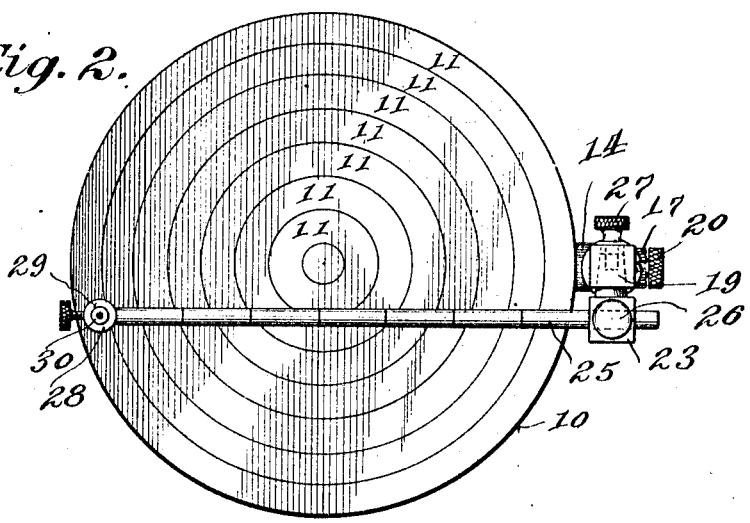
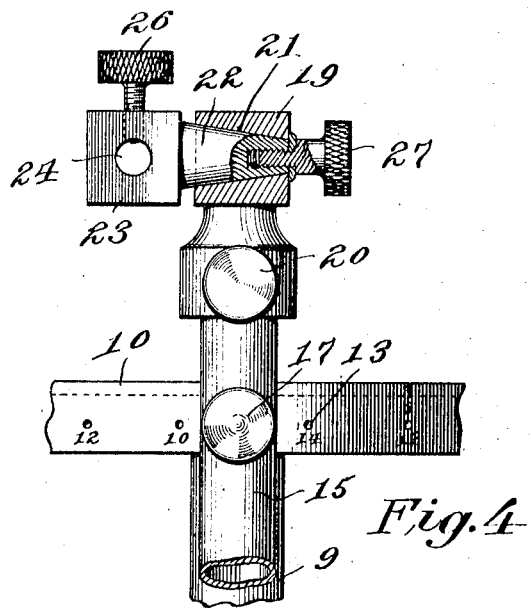
Witnesses
Inventor
Hugh E. Coleman
By Victor J. Evans
Attorney

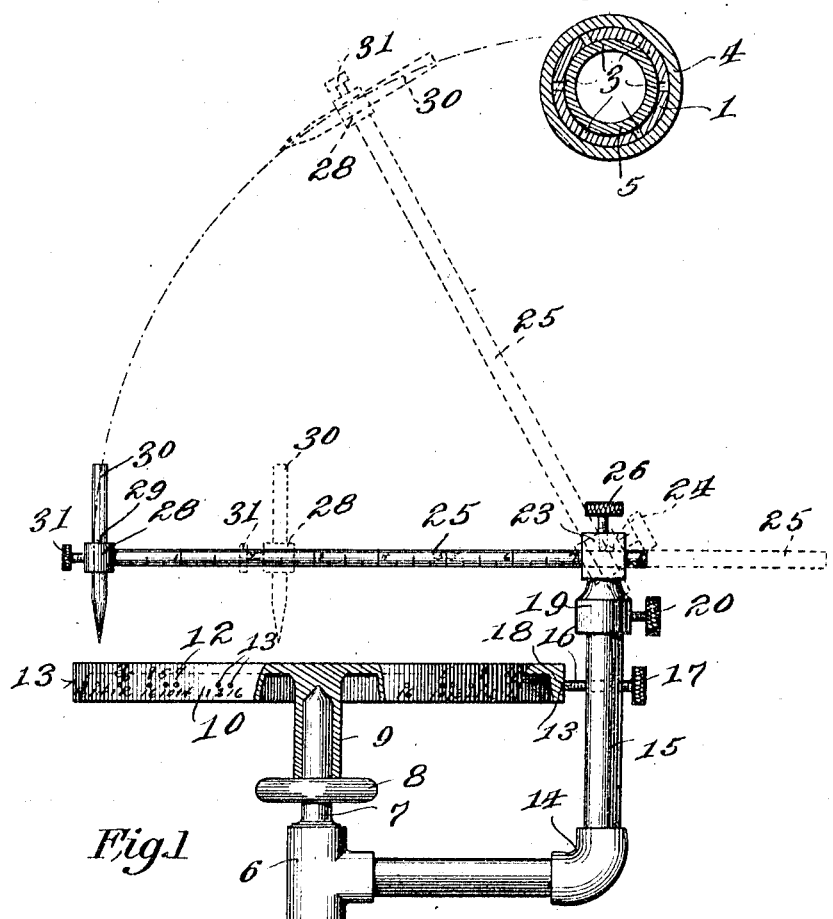

UNITED STATES PATENT OFFICE.

HUGH E. COLEMAN, OF ANNISTON, ALABAMA.

BANDING-WHEEL.

1,051,689.

Specification of Letters Patent.

Patented Jan. 28, 1913.

Application filed August 5, 1910. Serial No. 575,726.

*To all whom it may concern:*

Be it known that I, HUGH E. COLEMAN, a citizen of the United States, residing at Anniston, in the county of Calhoun and State of Alabama, have invented new and useful Improvements in Banding-Wheels, of which the following is a specification.

This invention relates to certain novel improvements in banding machines for china or the like.

In carrying out my invention, it is my purpose to provide a machine of this character which shall be of simple construction, and which shall embody a table, preferably of a rounded formation, which is movably mounted upon a suitable support, the device also contemplating the movement of an adjustable marking element, whereby figures may be inscribed upon and vertically supported upon the table.

With the above recited objects, and others of a similar nature in view, the invention consists in the construction, combination and arrangement of parts as set forth in and falling within the scope of the appended claims.

In the drawings, Figure 1 is a side elevation of a machine constructed in accordance with the present invention. Fig. 2 is a top plan view of the same. Fig. 3 is a sectional view taken upon the line 3—3 of Fig. 1. Fig. 4 is a detail elevation of a marker adjusting mechanism and supports therefor, parts being shown in section.

Referring now to the accompanying drawings in detail, the numeral 1 designates the standard of the machine. This standard preferably comprises a pipe section and has its upper extremity threaded as at 2 and is provided with slots 3 to allow the said end to be compressed when the threads thereof are engaged by a milled nut 4, as illustrated in Fig. 1 of the drawings. The nut 4 also engages with a pipe extension 5, the said pipe member 5 projecting within the standard 1 and being sustained at a proper position through the medium of the nut 4. The pipe 5 is preferably provided with a plurality of graduation marks indicated by the numeral 31', the said marks adapted to serve as a means whereby the said pipe may be elevated a predetermined distance by the standard 1, and for a reason which will hereinafter be set forth.

The numeral 6 designates a T which is connected with the pipe 5. This T is adapted to receive a spindle 7, the said spindle engaging within a depending sleeve 9 provided upon a table 10. The sleeve 9 is also preferably formed with a head 8, whereby the said table may be rotated upon the spindle 7.

The table 10 is provided with a plurality of annular depressions 11 whereupon different sized articles of china to be banded are seated, the said depressions insuring the central supporting of the plate and like china articles on the drum. The said table 10 is preferably of cylindrical formation and has its outer periphery provided with a plurality of depressions 13, the said peripheral portion is spaced off and numbered, for instance, from one-halves to sixteenths, as designated by indicating marks 12, which are arranged with relation to the said depressions and representing equal divisions of the circumference of the drum whereby the distance of rotation of the table upon its spindle may be determined and may be further utilized for dividing the plate into desirable divisions or spaces. Connected with the offset portion of T 6 is an L-shaped member 14, the extension of the vertical arm 15 of which is formed with a threaded opening, the same adapted to receive a threaded bolt 16. This bolt has its head 17 milled and its extremity pointed, as at 18, and the function of the said pointed extremity will be hereinafter described. The frame having been mechanically moved or rotated until the pointed extremity 18 of the bolt 16 is opposite one of the depressions 13, the said extremity is engaged with the depression 13, thereby temporarily locking the drum against further movement.

The upper extremity of the arm 5 has removably mounted thereon a cap 19, the same being provided with a threaded opening adapted for the reception of a threaded element 20 which is adapted to bear upon the member 15 to contact the same. By this arrangement it will be noted that the cap may be rotated upon the arm 15 of the member 14 and sustained in a desired position upon the said arm 15. The cap member 19 has its upper portion formed with a cone-shaped bore 21, the said bore being adapted to receive a cone-shaped off-set or shaft 22 provided upon a bearing 23.

The extremity of the cone-shaped shaft 22 is formed with a threaded opening, and adapted to engage with the said threads as well as to force the cone-shaped shaft 22 tightly within the bore 21, is a headed threaded member 27. The bearing 23 preferably comprises an angular member and is formed with a bore 24. The member 23 is further provided with a threaded opening which registers with the said bore 24 and received within the said opening is a threaded headed element 26. This member 26 is adapted to bear upon a graduated bar 25, the said bar being provided at one of its ends with a sleeve 28. The sleeve 28 is formed with a suitable threaded opening which communicates with its bore 29, the said opening adapted to receive a threaded headed element 31, and this element is adapted to bear against a marking member 30 to sustain the said member within the sleeve.

By reference to the dotted lines in Fig. 1 of the drawings, it will be noted that the rod 25 is not only longitudinally adjustable within the bearing 23 but that the said rod may be swung upon the shaft 22 of the said bearing. It will be further apparent that the said rod 25 may be rotated within its bearing to bring the marking element 30 to a desired angle with relation to the said bar and with relation to the chinaware which is to receive impressions from the said marking element.

From the above description, taken in connection with the drawings, it is thought that the operation of the device, as well as the detail structural features thereof will be perfectly apparent to those skilled in the art to which such inventions appertain, without further detailed description, and

Having thus described the invention what I claim is:—

1. In a device for the purpose set forth, a standard, a graduated vertically adjustable member carried by the standard, a rotatable table supported by the adjustable member, the table having its periphery provided with a plurality of spaced perforations, an L-shaped member connected with the vertically adjustable member, means provided upon the vertical arm of the said L-shaped member for contacting the periphery of the table to prevent the rotation thereof, a rotatable cap member removably connected with the vertical arm of the L-shaped member, a shaft carried by the cap, means for retaining the said shaft against rotation upon the cap member, said shaft having an enlarged extremity provided with a bore, a graduated bar within the bore, means for preventing the movement of the said bar when in the bore, the extremity of the bar having a sleeve, a marking element within the sleeve, and means for retaining the said marking element within the sleeve.

2. In a device for the purpose set forth, a standard, an adjustable and rotatable table upon the standard, means for preventing the rotation of the table, an L-shaped member, said L-shaped member having its upper extremity provided with a cap, a headed member having a cone-shaped shaft, the cap having its extremity provided with a cone-shaped opening, the head carried by the shaft being provided with a central opening, a right angularly arranged threaded aperture communicating with this opening, a screw for the aperture, a graduated bar slidably mounted within the opening, said bar having one of its extremities provided with a china pencil, and means for adjustably connecting the pencil to the bar.

In testimony whereof I affix my signature in presence of two witnesses.

HUGH E. COLEMAN.

Witnesses:
 Jos. V. Grant,
 J. A. Robertson.

Copies of this patent may be obtained for five cents each, by addressing the "Commissioner of Patents, Washington, D. C."